(12) United States Patent
Sternberger (10) Patent No.: US 6,554,224 B2
(45) Date of Patent: Apr. 29, 2003

(54) OUT-OF-PLANE THRUST REVERSER SLEEVE LOCK

(75) Inventor: Joe E. Sternberger, Wichita, KS (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 09/944,934

(22) Filed: Aug. 31, 2001

(65) Prior Publication Data

US 2003/0042358 A1 Mar. 6, 2003

(51) Int. Cl.[7] .................................................. F02K 1/76
(52) U.S. Cl. ................................... 244/110 B; 60/226.2
(58) Field of Search ...................... 244/110 B; 60/226.2, 60/230; 239/265.19

(56) References Cited

U.S. PATENT DOCUMENTS

| | | | |
|---|---|---|---|
| 4,047,682 A | 9/1977 | Brownhill | 244/110 B |
| 4,914,905 A | 4/1990 | Dubois et al. | 60/226.2 |
| 5,120,004 A | 6/1992 | Matthias | 244/110 B |
| 5,243,817 A | 9/1993 | Matthias | 60/226.2 |
| 5,280,704 A * | 1/1994 | Anderson et al. | 60/226.2 |
| 5,310,117 A | 5/1994 | Fage et al. | 244/110 B X |
| 5,524,431 A | 6/1996 | Brusson et al. | 60/226.2 |
| 5,547,130 A | 8/1996 | Davies | 239/265.29 |
| 5,720,449 A * | 2/1998 | Laboure et al. | 244/110 B |
| 5,735,557 A | 4/1998 | Harvey | 244/110 B X |
| 6,042,053 A | 3/2000 | Sternberger et al. | 244/110 B |
| 6,148,607 A | 11/2000 | Baudu et al. | 60/226.2 |
| 6,343,769 B1 * | 2/2002 | Davies | 244/110 B |

FOREIGN PATENT DOCUMENTS

EP 0 580 352 B1 12/1996

OTHER PUBLICATIONS

Joe E. Sternberger, U.S. patent Ser. No. 09/943,715 entitled Thrust Reverser Sleeve Lock, filed on Aug. 30, 2001, pp. 1–26 and 11 sheets of drawings.

* cited by examiner

Primary Examiner—Robert P. Swiatek
(74) Attorney, Agent, or Firm—Harness Dickey & Pierce P.L.C.

(57) ABSTRACT

A thrust reverser system for a jet engine has a thrust reverser sleeve lock, preferably for each thrust reverser sleeve, that provides at least one of the redundant anti-deployment mechanisms of the thrust reverser. The thrust reverser sleeve lock has a lock pin that engages a lock pin hole in a slider of the thrust reverser when the thrust reverser sleeve is in a stowed position and the thrust reverser sleeve lock is in a lock position to prevent the thrust reverser sleeve from deploying. The thrust reverser sleeve lock is located out of a plane in which other anti-deployment mechanisms of the thrust reverser are located.

22 Claims, 11 Drawing Sheets

OUT-OF-PLANE THRUST REVERSER SLEEVE LOCK

FIELD OF THE INVENTION

The present invention relates to thrust reversers for jet engines, and more particularly, to sleeve locks for thrust reversers.

BACKGROUND OF THE INVENTION

Jet aircraft, such as commercial passenger and military aircraft, utilize thrust reversers on the aircraft's jet engines to reduce the aircraft's speed after landing. One type of thrust reverser used in modern jet aircraft is the cascade type, described in more detail in U.S. Pat. No. 5,448,884. For ease of reference, the description of the cascade type of thrust reverser is substantially reproduced herein.

Figure 1:
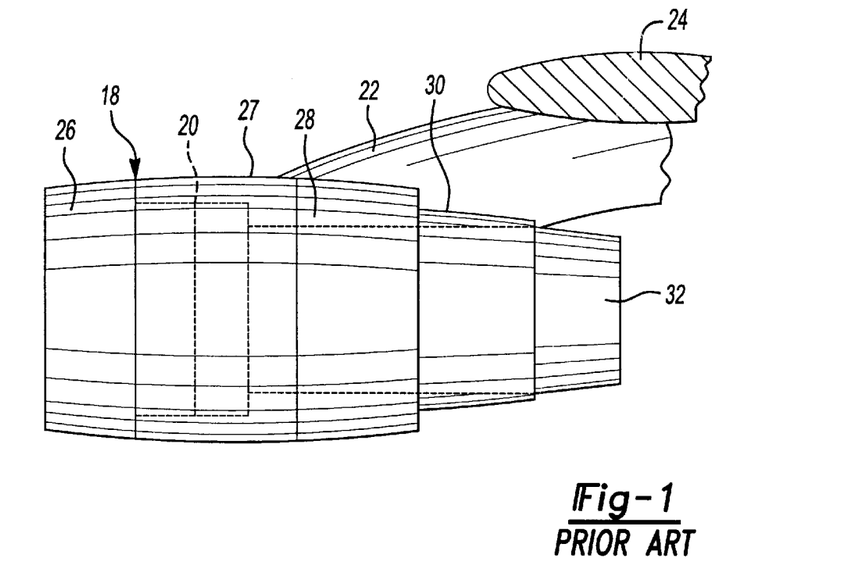
FIG. 1 is a side view of a conventional nacelle and strut.

Referring first to FIG. 1, there is shown a conventional aircraft nacelle indicated at 18 which includes a jet engine, such as a Pratt & Whitney PW4000, indicated at 20 (shown in hidden lines) supported by a strut 22 on a wing 24 (only a portion of which is shown). The nacelle 18 includes a nose cowl 26, a fan cowl 27, a thrust reverser sleeve 28, a core cowl 30 and nozzle exhaust 32. Although some of these components are made up of two mirror image parts split vertically in a clamshell arrangement, each component will be referred to herein as being one piece.

Figure 2:
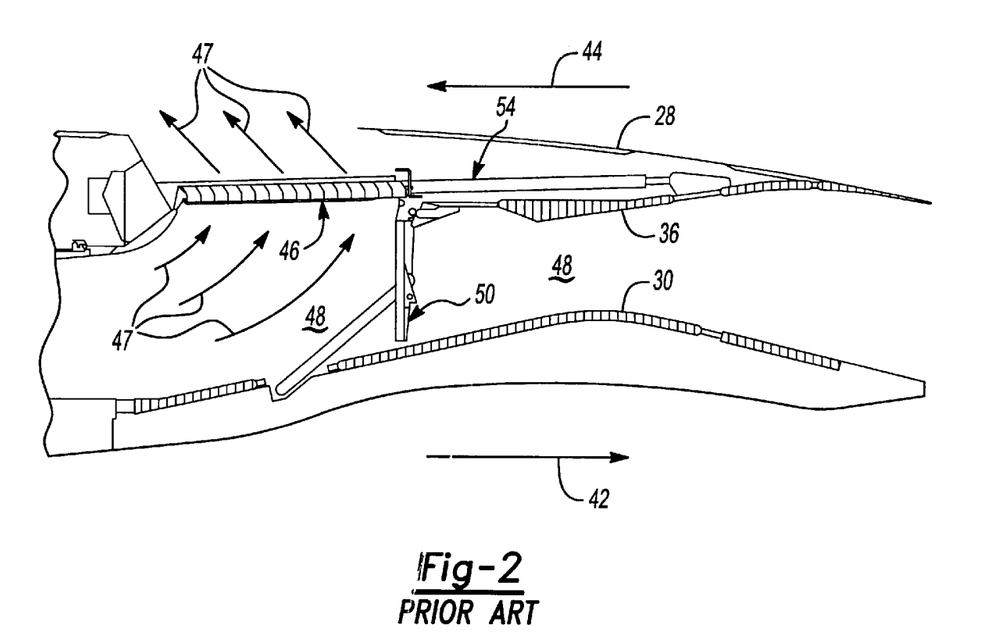
FIG. 2 is a side sectional view of a conventional thrust reverser system.
Figure 3:
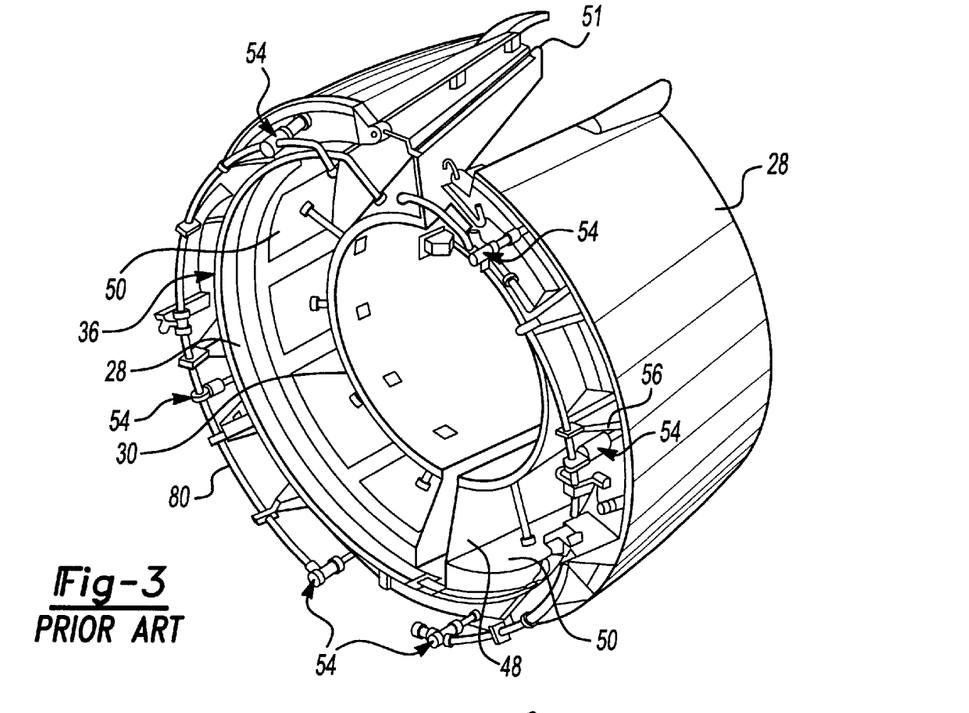
FIG. 3 is an isometric view of a conventional thrust reverser system.

As shown in more detail in FIGS. 2 and 3, the thrust reverser system includes an inner duct (fan duct cowl) 36 and outer sleeve 28. The sleeve 28 translates in an aft direction indicated by an arrow identified by a number 42 in FIG. 2, and a forward direction indicated by an arrow identified by a number 44. When the thrust reverser is deployed, the translating sleeve 28 moves aft from a "stowed" position shown in FIG. 1 to a "deployed" position shown in FIG. 2. In this process, cascade vanes 46 (FIG. 2) mounted to a thrust reverser support structure are uncovered. Vanes 46 are slanted in a forward direction so that during thrust reverser operation, fan air from the engine is redirected forward through the vanes (indicated by arrows 47) to aid in decelerating the airplane.

Air driven aft by the engine fan flows along an annular duct 48 (FIGS. 2 & 3) formed by the fan duct cowl 36 and core duct cowl 30. Movement of the sleeve 28 in the aft direction, causes blocker doors 50 to pivot from their stowed positions (shown in FIG. 3) to their deployed positions (shown in FIG. 2) where the doors are positioned to block rearward movement of the air through duct 48. In this manner all rearward movement of the engine fan air is redirected forward through the cascade vanes 46.

Figure 4:
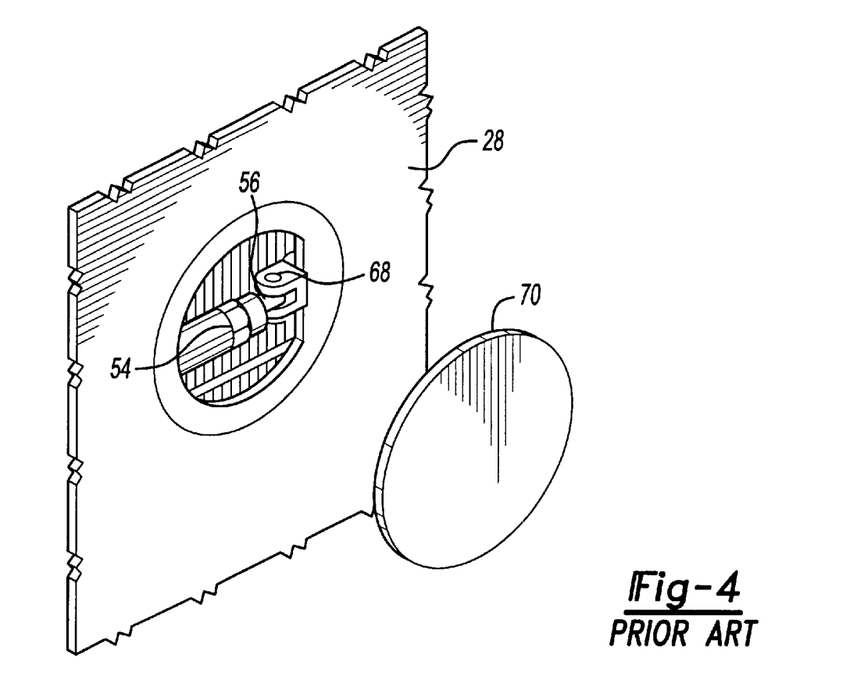
FIG. 4 is a partial view of a conventional thrust reverser sleeve showing an access port located on the sleeve.
Figure 5:
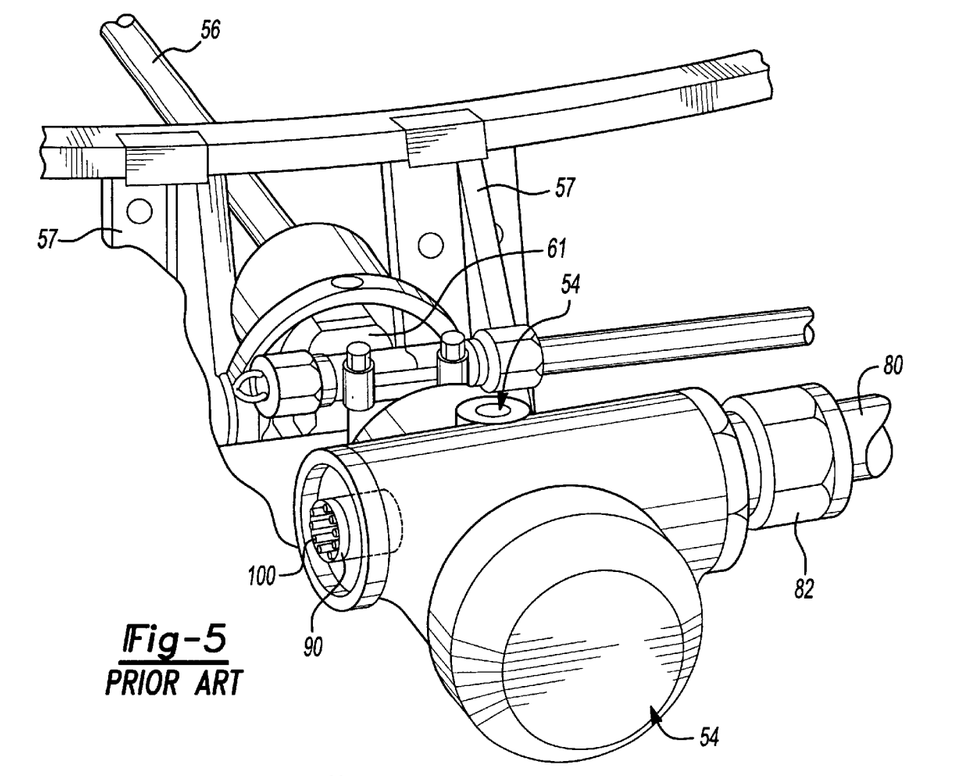
FIG. 5 is an isometric view of a conventional thrust reverser actuator.
Figure 6:
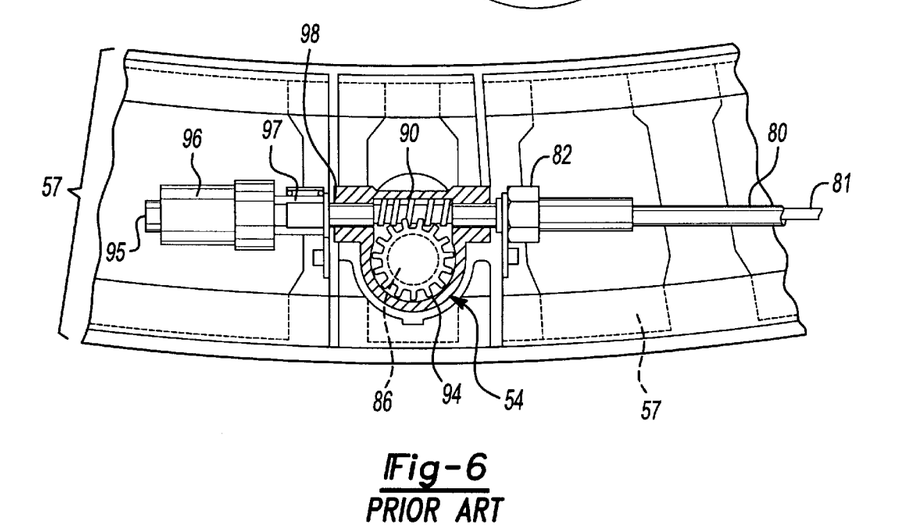
FIG. 6 is a side view of the conventional thrust reverser actuator shown in FIG. 5.

Movement of the sleeve 28 is guided along a pair of parallel tracks mounted to the top and bottom of the fan duct cowl 36 in a fore and aft direction. The sleeve 28 is moved between the stowed and deployed positions by means of a number of hydraulic actuators indicated at 54 (FIG. 3), each having an actuator rod 56 which is connected to the sleeve 28. More specifically, as shown in FIGS. 5 and 6, each actuator 54 is connected to a structural torque box 57 via a gimbal mount 61 thereby allowing the actuator to accommodate lateral variances in sleeve motion. As shown in FIG. 4, the actuator rod 56 is located inside the aerodynamic surface of sleeve 28 and is connected to the sleeve 28 by a ball joint 68. The ball joint 68 is accessible by removing a panel 70 which is bolted to the exterior surface of the sleeve 28.

In operation, when the thrust reverser is commanded by the pilot to the deployed position, each actuator rod 56 (FIG. 5) extends in the aft direction. Conversely, when the thrust reverser is commanded by the pilot to move to the stowed position, each actuator rod 56 retracts in the forward direction. In an exemplary embodiment, the actuator 54 is a thrust reverser actuator currently installed on Boeing 767 airplanes.

Figure 7:
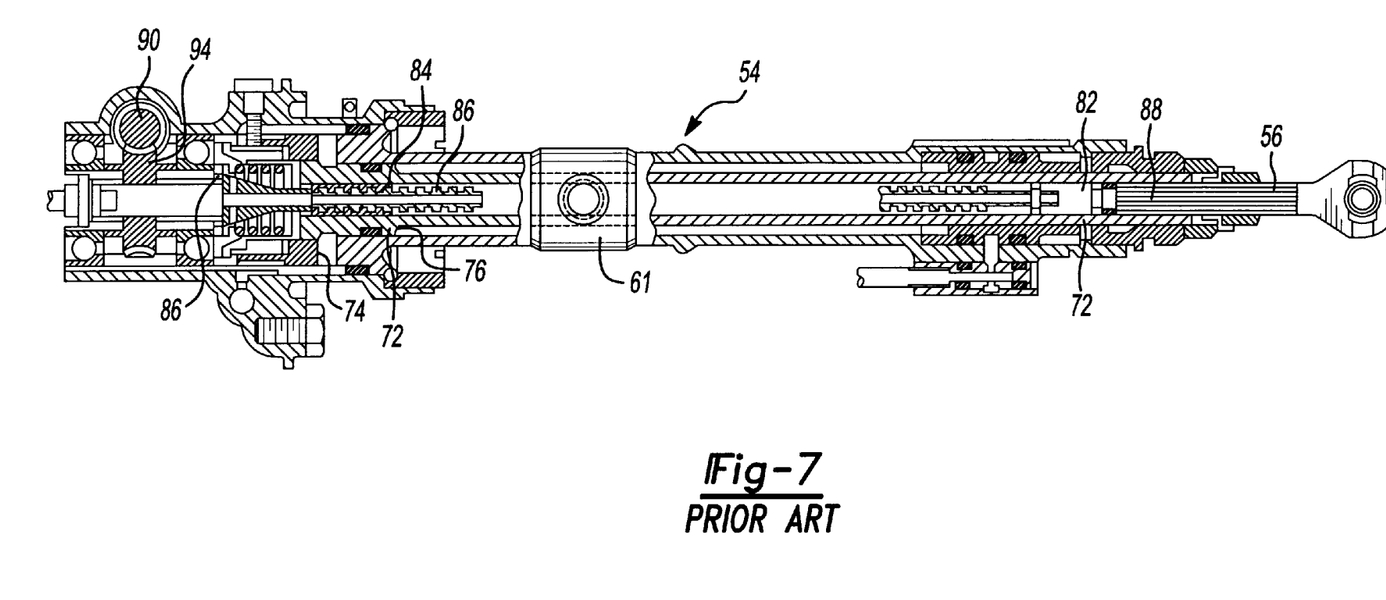
FIG. 7 is side sectional view of the thrust reverser actuator shown in FIGS. 5 and 6.
Figure 8:
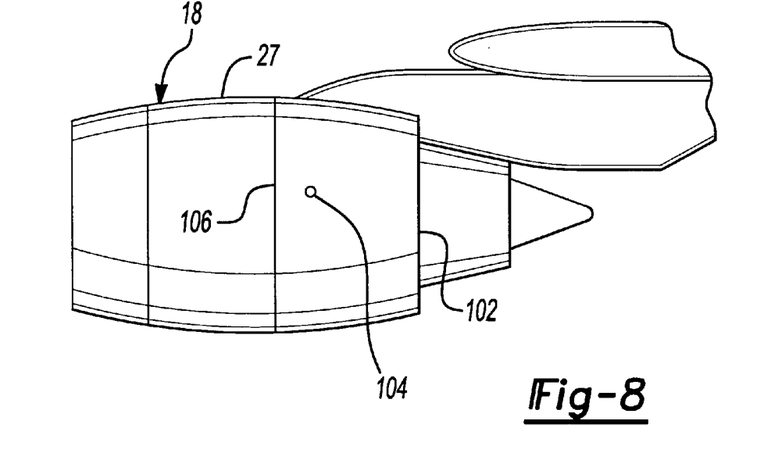
FIG. 8 is a side view of a nacelle and thrust reverser having a thrust reverser sleeve lock in accordance with the invention.

As shown in FIG. 7, each actuator 54 includes a double acting piston 72 which is extended in the rightward direction (with reference to FIG. 7) by hydraulic pressure acting against a face 74 of the piston 72. Retraction of the piston 72 and the thrust reverser sleeve therewith is accomplished by relieving hydraulic pressure from the piston face 74, so that hydraulic pressure acting against an opposing face 76 of the piston causes it to move in the leftward direction. The piston 72 is connected to the actuator rod 56 which in turn is connected to the thrust reverser sleeve 28 in the manner described previously.

In the exemplary embodiment, each thrust reverser sleeve is driven by three of the actuators 54 (FIG. 3). It is important that each actuator 54 extend and retract the sleeve at the same rate to avoid causing the sleeve to bind along the tracks 51. To accomplish this, operation of each of the three actuators 54 is synchronized by means of an interconnecting synchronizing shaft 80. The sync shaft 80 (FIGS. 5 and 6) is a tube having a stationary outer sleeve and an internal rotating flexible shaft 81 which synchronizes motion of the three actuators. The outer sleeve of the sync shaft 80 is connected to the actuator 54 by a swivel coupling 82.

Thrust reversers include various anti-deployment mechanisms to prevent in-flight deployment, such as locking actuators, non-locking actuators, synchronization shaft locks (sync lock), and auto-restow systems. Thrust reversers presently used on Boeing aircraft have three levels of anti-deployment mechanisms. For example, thrust reversers used on wide body aircraft illustratively have two locking actuators per nacelle and one sync lock per nacelle. Thrust reversers used on narrow body aircraft illustratively have one locking actuator per nacelle, one sync lock per nacelle, and an auto-restow system per nacelle.

It is an object of this invention to provide a thrust reverser sleeve lock that can be used as one of the levels of anti-deployment mechanisms on thrust reversers and that is located out of the plane in which other of the anti-deployment mechanisms are located.

SUMMARY OF THE INVENTION

A thrust reverser system for a jet engine has a thrust reverser sleeve lock, preferably for each thrust reverser sleeve, that provides at least one of the redundant anti-deployment mechanisms of the thrust reverser and that is located out of the plane in which the other anti-deployment mechanisms are located. The thrust reverser sleeve lock has a lock pin that engages a lock pin hole in a slider of the thrust reverser actuation system when the thrust reverser sleeve is in a stowed position and the thrust reverser sleeve lock is in a lock position to prevent the thrust reverser sleeve from deploying. In an embodiment of the invention, the thrust reverser sleeve lock includes an single-action hydraulically actuated actuator to which the lock pin is affixed, the actuator extending the lock pin into the lock hole in the slider when the thrust reverser sleeve is in its stowed position and the thrust reverser sleeve lock is in a lock position. The actuator is actuated by pressurized hydraulic fluid from the thrust reverser actuation system when it deploys the thrust reverser sleeves and retracts the lock pin from the lock pin hole in the slider, allowing the thrust reverser sleeve to be deployed. In an embodiment of the invention, a mechanical actuation mechanism is coupled to the actuator to provide manual actuation of the actuator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 11:
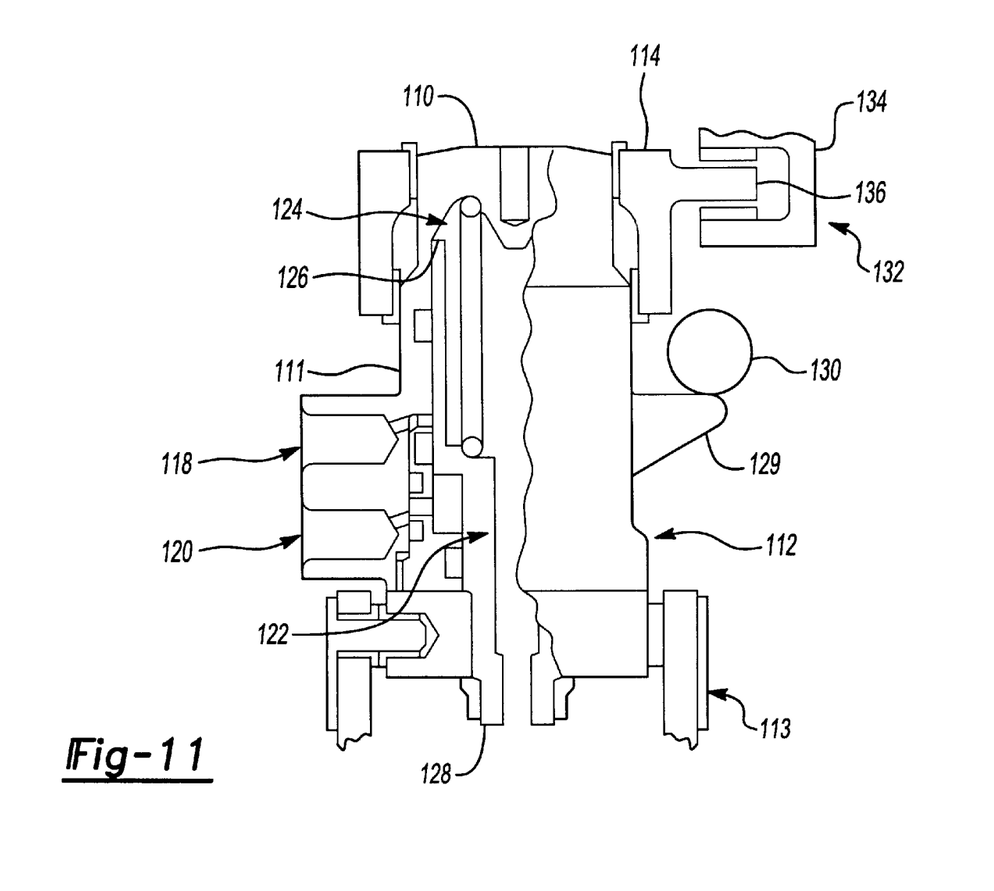
FIG. 11 is a partial sectional side view of the thrust reverser sleeve lock of FIG. 10 taken along line 11—11 of FIG. 10.
Figure 12:
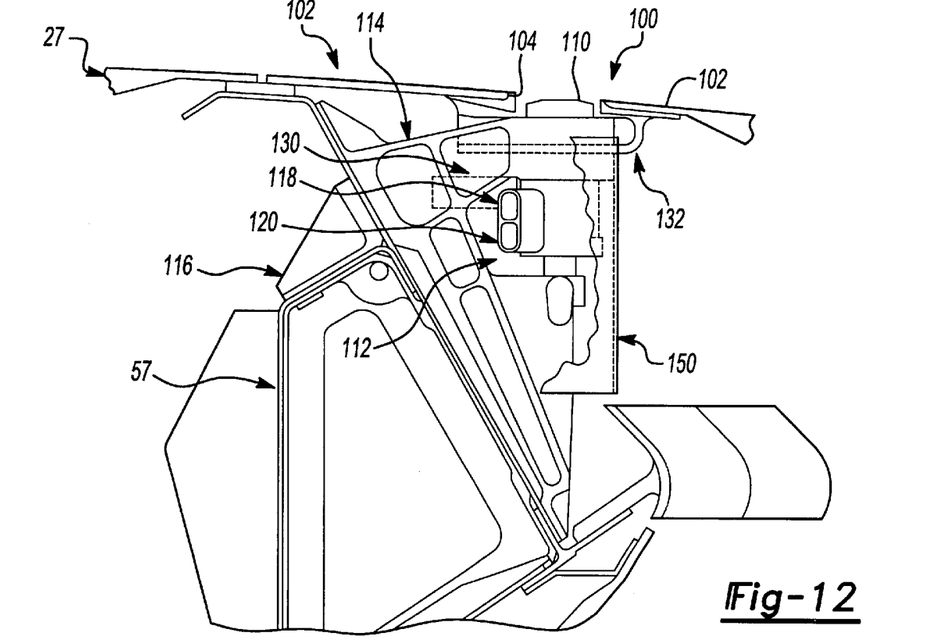
FIG. 12 is a side view of the thrust reverser sleeve lock of FIG. 9 in a locked position.

Referring to FIGS. 8–14, a thrust reverser sleeve lock 100 in accordance with an embodiment of the present invention is shown. Elements common to the elements shown in FIGS. 1–7 will be identified with the same reference numerals. Engine nacelle 18 (FIG. 8) has fan cowl 27 and thrust reverser sleeves 102. Each thrust reverser sleeve 102 is similar to thrust reverser sleeves 28 (FIGS. 1–3) with the addition of a lock pin hole 104 located proximate a front edge 106 (FIG. 8) of thrust reverse sleeve 102. A thrust reverser sleeve lock 100 for each thrust reverser sleeve 102 is mounted inside of engine nacelle 18. Each thrust reverser sleeve lock 100 has an actuator 112 with a lock pin 110 that extends through lock pin hole 104 of the respective thrust reverser sleeve 102 when actuator 112 is in its locked position as shown in FIG. 12. When actuator 112 of thrust reverser sleeve lock 100 is in its locked position, the extension of lock pin 110 through lock pin hole 104 in the thrust reverser sleeve 102 provides a visual indication that thrust reverser sleeve lock 100 is in its locked position.

Figure 9:
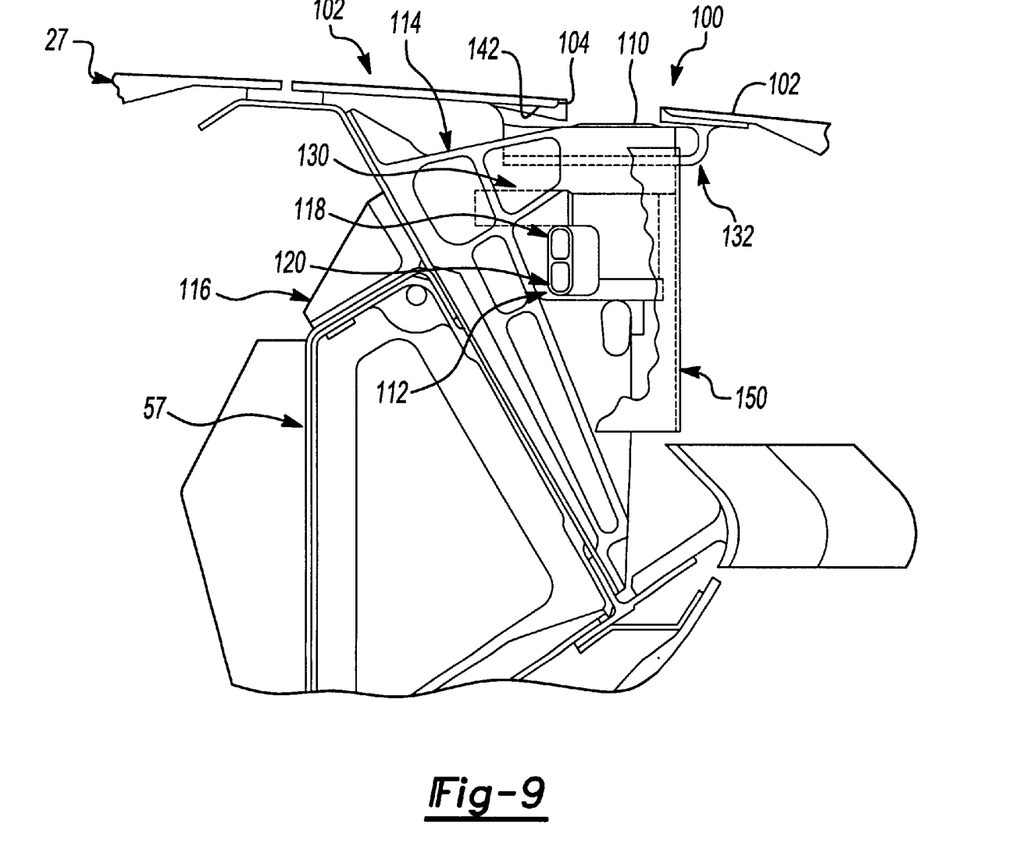
FIG. 9 is a side view of a thrust reverser sleeve lock in accordance with the invention in an unlocked position.
Figure 10:
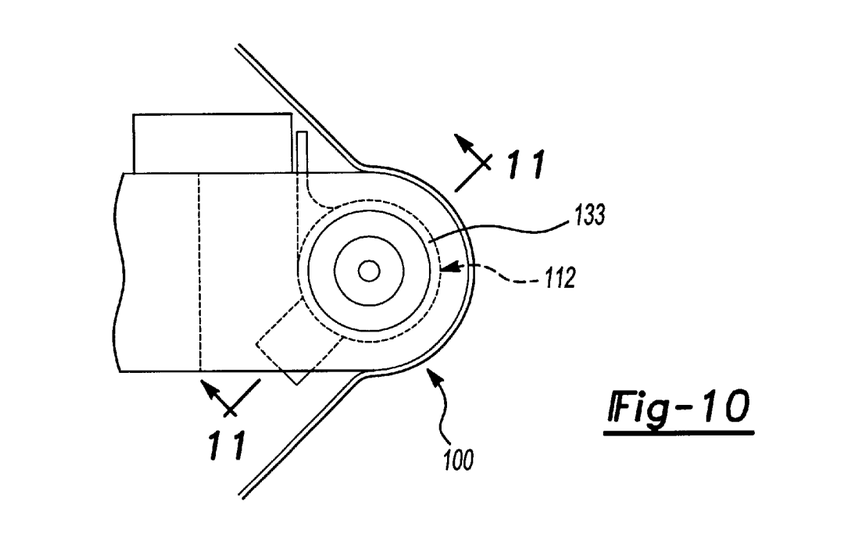
FIG. 10 is a partial top view of the thrust reverser sleeve lock of FIG. 9.

Actuator 112 has a body 111 with lock pin 110 affixed at its top (as oriented in FIG. 11). Alternatively, the top of body 111 is formed as lock pin 110. Actuator 112 has a shaft 122 axially extending through body 111. A lower end 128 (as oriented in FIGS. 9 and 11) of shaft 122 extends out of body 111 and is coupled to a trunion 113. Trunion 113 is affixed to an attachment fitting 114 (FIGS. 9 and 12). Attachment fitting 114 is attached to a fixed or non-moving (with respect to thrust reverser sleeve 102) element of the thrust reverser system, such as torque box 57 and back-up fitting 116, in conventional fashion, such as by bolting, riveting, welding, or the like. Body 111 of actuator 112 has a hydraulic port 118 coupled to the thrust reverser hydraulic system (not shown) for normal operation and a pneumatic port 120 coupled via a tubing and flex hose assembly (not shown) to a quick connect pneumatic fitting (not shown) on torque box 57. Pneumatic port 120 provides for manual operation of actuator 112, discussed in more detail below.

Actuator 112 is illustratively a single-action actuator wherein body 111 of actuator 112 retracts downwardly (as oriented in FIGS. 9, 11 and 12) along shaft 122 from a lock position shown in FIG. 12 to an unlock position shown in FIGS. 9 and 11 when pressurized hydraulic fluid or air is provided at hydraulic port 118 or pneumatic port 120, respectively. When pressurized hydraulic fluid or air is removed (or sufficiently reduced) from the respective hydraulic port 118 and pneumatic port 120, the action of an internal spring 124 (FIG. 11) of actuator 112 extends body 111 of actuator 112 upwardly from its unlock position to its lock position.

Body 111 of actuator 112 further includes a proximity target 129 (FIG. 11) for triggering a proximity switch 130 mounted within engine nacelle 18. Proximity switch 130 senses whether actuator 112 is in its lock or unlock position and provides an electrical signal indicative thereof to a cockpit display (not shown).

Thrust reverser sleeve lock 100 further includes a guide fitting 132 affixed to an inner surface of thrust reverser sleeve 102. Guide fitting 132 includes a hole (not shown) coaxially aligned with the lock pin hole 104 in the thrust reverser sleeve 102. Lock pin hole 104 and the coaxially aligned hole in guide fitting 132 are oversized with respect to lock pin 110 to ensure that thrust reverser sleeve 102 and guide fitting 132 do not interfere with the extension of lock pin 110 and to provide clearance in the event that deactivation bolt 148 (FIG. 14) is utilized. Guide fitting 132 further includes a ramp 142 at an upper, forward edge 144 (as oriented in FIG. 13). Lock pin 110 of actuator 112 further includes a threaded hole 146 in the center thereof for receiving a deactivation bolt 148 (FIG. 14). Thrust reverser sleeve lock 100 further includes an aerodynamic shield 150 affixed to attachment fitting 114 around actuator 112.

When the thrust reverser sleeves 102 are deployed to slow the aircraft, the thrust reverser hydraulic actuation system (not shown) controls hydraulic fluid flow to provide pressurized hydraulic fluid at hydraulic port 118 of actuator 112 of thrust reverser sleeve lock 100. The pressurized hydraulic fluid exerts a sufficient force in actuator 112 to overcome spring 124, causing body 111 of actuator 112 to move downwardly (as oriented in FIGS. 9, 11 and 12) pulling lock pin 110 out of lock pin hole 104 in the associated thrust reverser sleeve 102. Actuator 112 is sized such that lock pin 110 will be fully retracted before thrust reverser sleeves 102 begin to move from their stowed positions.

Figure 13:
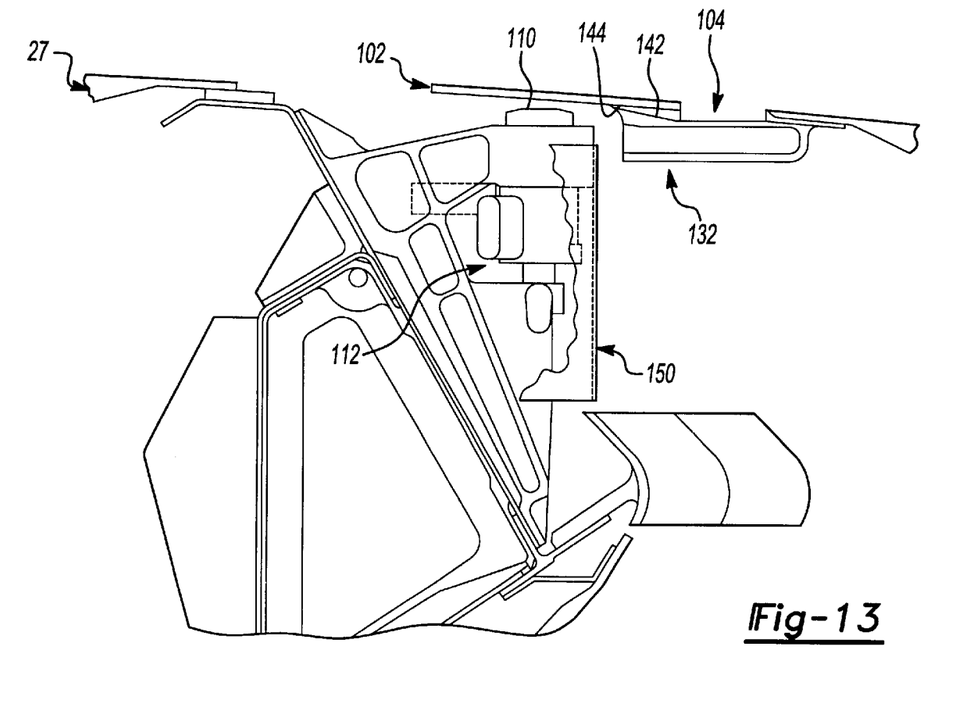
FIG. 13 is a side view of the thrust reverser sleeve lock of FIGS. 9 and 12 with the thrust reverser sleeve deployed
Figure 14:
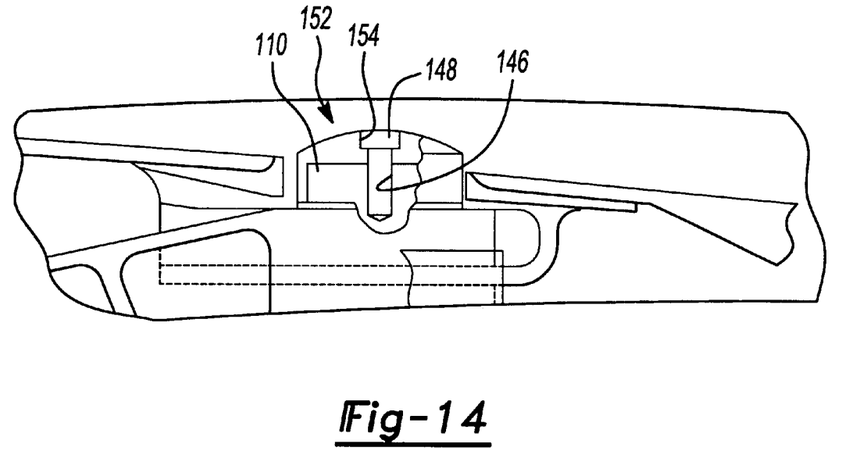
FIG. 14 is a side view of a deactivation adapter for a thrust reverser sleeve lock in accordance with the invention.

When thrust reverser sleeves 102 have been deployed (or at least partially deployed), as shown in FIG. 13, the lock pin holes 104 in thrust reverser sleeves 102 are disposed behind the lock pins 110 of the actuators 112 of the respective thrust reverser sleeve locks 100 as are the front edges 144 of the respective guide fittings 132. Hydraulic pressure to hydraulic ports 118 of actuators 112 has also been controlled by the thrust reverser hydraulic actuation system (not shown) so that bodies 111 of actuators 112 are extended by springs 124 of their respective actuators 112, extending their respective lock pins 110.

When thrust reverser sleeves 102 are to be returned to the stowed position, hydraulic flow is controlled by the thrust reverser hydraulic actuation system to allow the translation actuators to move the thrust reverser sleeves 102 to their stowed positions. As each thrust reverser sleeve 102 moves to its stowed position, the ramp 142 of guide fitting 132 moves across lock pin 110 and exerts sufficient force on lock pin 110 to overcome the spring force exerted by spring 124 in actuator 112 to force lock pin 110 toward the unlock position. When thrust reverser sleeve 102 approaches its stowed position, body 111 of actuator 112 is forced by spring 124 in actuator 112 through lock pin hole 104 in thrust reverser sleeve 102 to return actuator 112 to its lock position. Illustratively, this occurs when thrust reverser sleeve 102 is within approximately one tenth of an inch of its stowed position. In this regard, return pressure in the thrust reverser hydraulic actuation system (not shown) during the stow operation will reduce the resultant force on lock pin 110, or eliminate it, minimizing wear on lock pin 110 by ramp 142 of guide fitting 132.

Attachment fitting 114 has a radially outwardly extending tang 136 (FIG. 11) that is received in a C-channel 134 of guide fitting 132. Tang 136 and C-channel 134 cooperate to maintain guide fitting 132 in place over lock pin 110.

Actuator 112 can be manually (non-hydraulically) actuated to retract lock pin 110 by applying pressurized air to pneumatic port 120 of actuator 112. The thrust reverser sleeves 102 can then be manually driven to their deployed position to provide access to service and inspect the thrust reversers.

Figure 15:
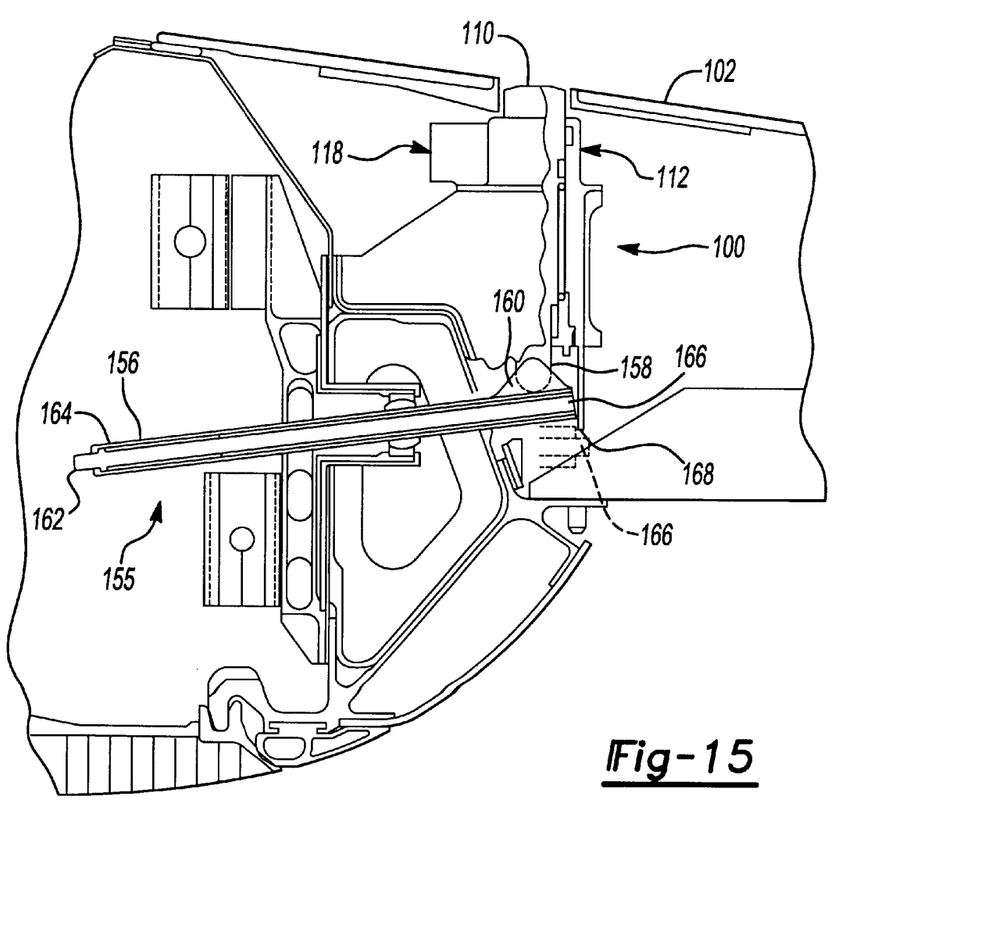
FIG. 15 is a side view of the thrust reverser sleeve lock of FIGS. 9 and 12 modified to have a mechanical manual release mechanism.

Referring to FIG. 15, a modification to thrust reverser sleeve lock 100 is shown where manual actuation is provided by a mechanical manual release mechanism 155. Mechanical manual release mechanism 155 has a manual release handle 156 having a distal end 160 attached to a lower end 158 of actuator 112. Manual release handle 156 has a spring loaded button 162 disposed within a proximal end 164 of manual release handle 156 having a distal end 166 disposed in distal end 160 of manual release handle 156. Displacing manual release lever 156 upwardly (as oriented in FIG. 15), pulls actuator 112 downwardly, retracting lock pin 110. Manual release lever 156 is retained in its unlocked position by depressing spring loaded button 162 after manual release lever 156 is displaced upwardly. Depressing spring loaded button 162 extends its distal end 166, which then catches on a corresponding tab 168 of attachment fitting 112, as shown in phantom in FIG. 15, when manual release lever is allowed to move down slightly. The friction force between distal end 166 of spring loaded button 162 and tab 168 keeps distal end tab 166 engaged with tab 168, thus maintaining manual release lever 156 in its unlocked position. The manual release lever 156 is released from its unlocked position by displacing it upwardly, which allows distal end 166 of spring loaded button 162 to release from tab 168 and be retracted by the spring force of spring loaded button 162. In the event that manual release handle 156 is left in its unlocked position, the normal required subsequent operation of the thrust reverser under hydraulic power will automatically reset manual release lever 156 to its locked position. In the embodiment of FIG. 15, actuator 112 would illustratively not have pneumatic port 120.

Occasionally, due to a failure or suspected failure of the thrust reversers or the thrust reverser actuation system, the thrust reverser must be disabled or deactivated. Thrust reverser lock sleeve 100 can include a deactivation adapter 152 (FIG. 14) that is placed around lock pin 110 and secured in place by deactivation bolt 148 being tightened into threaded hole 146 in lock pin 110. When secured in place around the extended end of lock pin 110, deactivation adapter 152 butts up against attachment fitting 114 and prevents lock pin 110 from being retracted. Deactivation adapter 152 is illustratively a cylindrical cap adapted to be placed over the extended end of lock pin 110 and having a bolt hole 154 in the center thereof through which deactivation bolt 148 is inserted into threaded hole 146 in lock pin 110.

Figure 16:
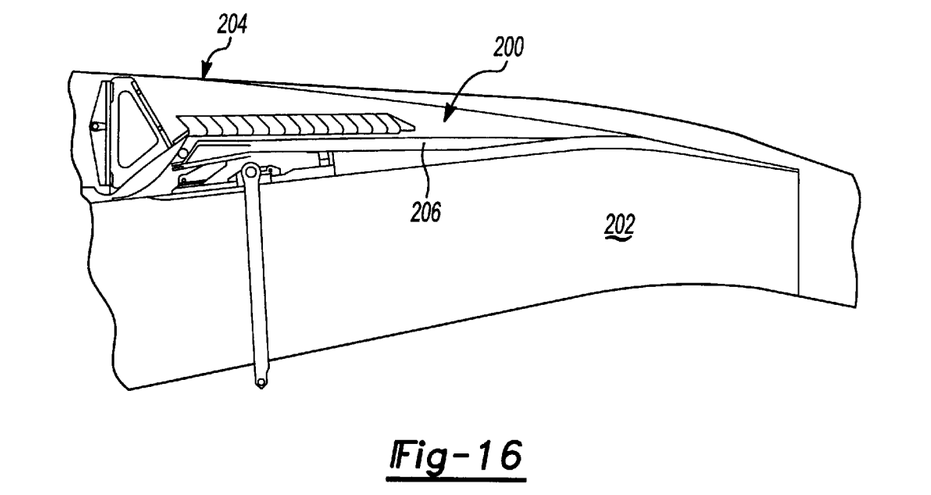
FIG. 16 is a side view of a cascade thrust reverser having an out-of-plane thrust reverser sleeve lock in accordance with an embodiment of the invention.
Figure 17:
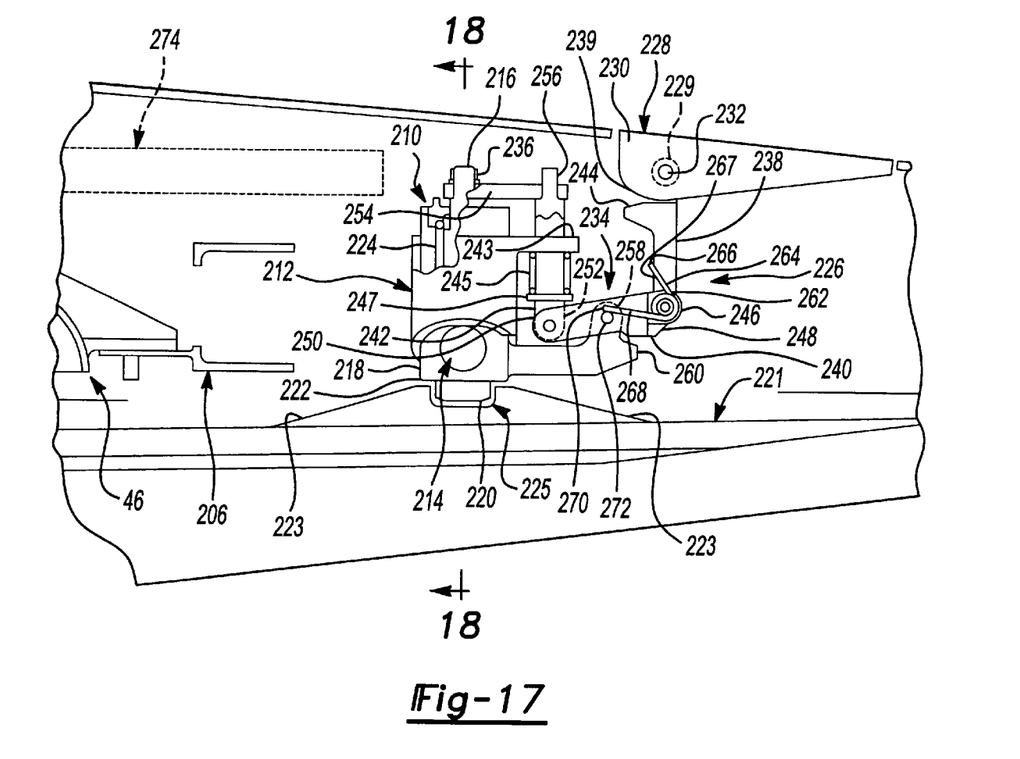
FIG. 17 is a side view of the out-of-plane thrust reverser sleeve used in the cascade thrust reverser of FIG. 16 in a lock position.
Figure 18:
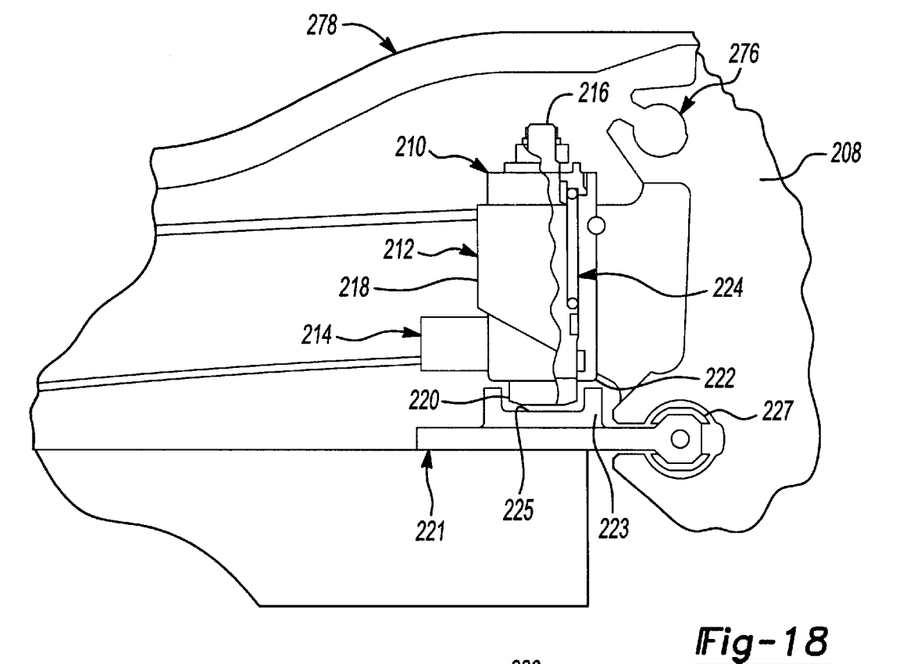
FIG. 18 is a section view of the out-of-plane thrust reverser sleeve lock of FIG. 17 taken along the line 18—18 of FIG. 17.
Figure 21:
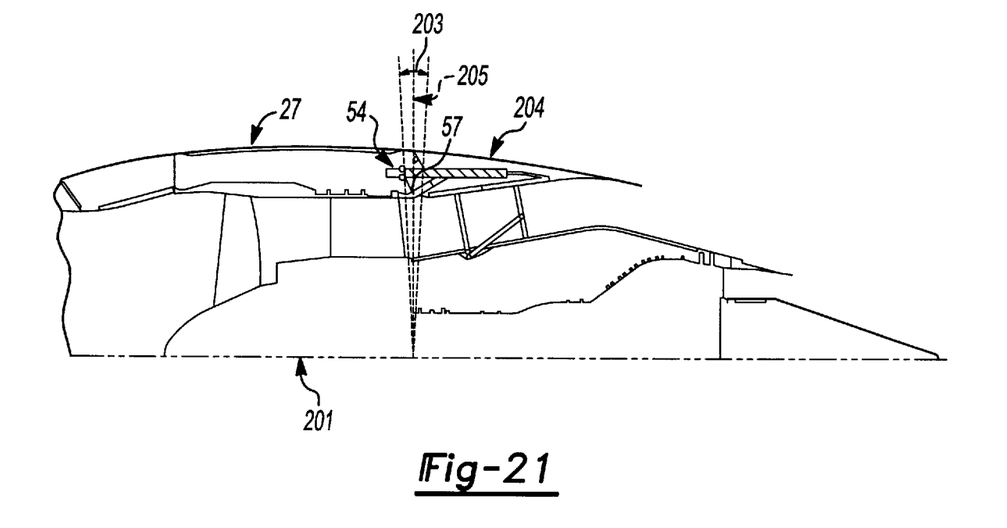
FIG. 21 is a side view of a cascade type thrust reverser showing an out-of-plane region.

Referring to FIGS. 16–18, an out-of-plane thrust reverser thrust reverser sleeve lock 200 is shown where the thrust reverser sleeve lock 200 is located out of a plane 205 (taken normal to the longitudinal centerline 201 (FIG. 21) of nacelle 18) in which other anti-deployment mechanisms, such as locking actuators that may be employed as translation actuators 54, are located. In this regard, with reference to FIG. 21, thrust reverser sleeve lock 200 is located axially outside of an uncontained rotor failure angular impact area 203 (taken from the intersection of the plane 205 in which the other thrust reverser anti-deployment mechanisms are located and the centerline 201 of nacelle 18) to comply with Draft Advisory Circular AC25.933X. Preferably, one thrust reverser sleeve lock 200 is located within a cavity 202 of thrust reverser sleeve 204, immediately aft of a cascade support ring 206 and next to a bifurcation beam 208 (FIGS. 17 and 18). Cascade support ring 206 and bifurcation beam 208 are known elements of a cascade type thrust reverser system.

With specific reference to FIGS. 17 and 18, thrust reverser sleeve lock 200 includes an actuator 210 secured to bifurcation beam 208 by an actuator mount 212. Actuator mount 212 may be formed integrally with actuator 210 or be a separate part affixed to actuator 210. Actuator 210 is illustratively a single-action hydraulically actuated actuator having a hydraulic port 214, a shaft 216 extending axially through a body 218 of actuator 210. A lock pin 220 is affixed to shaft 216 at a first end 222 of shaft 216. Lock pin 220 could also be formed as an integral part of shaft 216. Actuator 210 further includes a return spring 224 within body 218 that returns shaft 216 of actuator 210 downwardly (as oriented in FIGS. 17 and 18) to extend lock pin 220 out of body 218 of actuator 210.

A main track slider 221 of the thrust reverser actuation system has a ramp 223 that is inclined in fore and aft directions along main track slider 221. Main track slider 221 is coupled to thrust reverser sleeve 204 in known fashion and translates with thrust reverser sleeve 204. Ramp 223 has a lock pin engagement element 225 at its center. Lock pin engagement element 225 could illustratively be a lock pin hole, a lug, or other comparable element that engages lock pin 220 when lock pin 220 is extended. Main track slider 221 travels in a track 227 (FIG. 18) in bifurcation beam 208 as thrust reverser sleeve 204 translates between its deployed and stowed positions. Main track slider 221 (without ramp 223) and track 227 are known elements of a cascade type thrust reverser system, as are auxiliary slider 274, auxiliary slider track 276 in bifurcation beam 208 (in which auxiliary slider 274 slides) and auxiliary slider track faring 278.

When thrust reverser sleeve lock 200 is in a lock position, as shown in FIGS. 17 and 18, lock pin 220 engages lock pin engaging element 225 in ramp 223 of main track slider 221, thus preventing the associated thrust reverser sleeve 204 from moving from its stowed position. When the thrust reverser actuation system hydraulic system (not shown) is pressurized to deploy thrust reverser sleeves 204, hydraulic pressure is applied to hydraulic port 214 of each actuator 210, creating sufficient pressure within actuator 210 to overcome return spring 224, thus retracting lock pin 220. Thrust reverser sleeves 204 are then allowed to be moved to their translated position by the translation actuators of the thrust reverser actuation system, such as translation actuators 54 (FIG. 3). Actuator 210 is sized so that lock pin 220 will be retracted before thrust reverser sleeves begin to move from their stowed positions.

When hydraulic flow is controlled by the thrust reverser actuation system's hydraulic actuation system (not shown) to allow the translation actuators to move the thrust reverser sleeves 204 to the stowed position, ramp 223 on main track slider 221 slides across lock pin 212 of actuator 210 and forces lock pin 220 toward its retracted position. When each thrust reverser sleeve 204 approaches its stowed position, preferably when it reaches 0.1 inch of its stowed position, lock pin hole 225 in ramp 223 is positioned so that lock pin 220 of actuator 210 engages lock pin engaging element 225 under the urging of return spring 224. In this regard, lock pin engaging element 225 is sized with respect to lock pin 212 to provide for alignment clearance between lock pin 220 and lock pin engaging element 225. It should be noted that return pressure in the hydraulic system of the thrust reverser actuation system may reduce the amount of force that ramp 223 must exert on lock pin 220 to overcome return spring 224, or eliminate it, thus reducing wear on ramp 223 and lock pin 220 as ramp 223 slides across lock pin 220.

Figure 19:
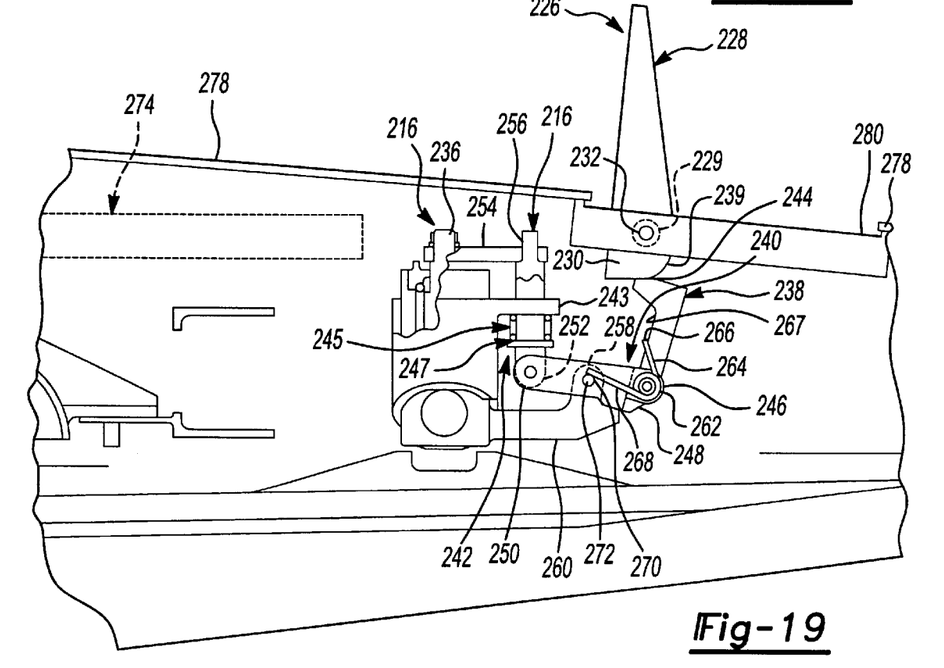
FIG. 19 is a side view of the out-of-plane thrust reverser sleeve lock of FIG. 17 with a manual release mechanism in a release position.

Thrust reverser sleeve lock 200 also includes a manual release mechanism 226. With reference to FIGS. 17–19, manual release mechanism 226 includes manual release handle 228 rotatably coupled at a first end 230, such as by a hinge pin 232, to a housing 280 attached to faring 278, and having a return spring 229 that urges manual release handle 228 to a non-release position as shown in FIG. 17, as described in more detail below. In its non-release or closed position, shown in FIG. 17, manual release handle 228 is flush with faring 278.

Manual release mechanism 226 also has a linkage 234 that couples manual release handle 228 to a second end 236 of shaft 216 of actuator 210. Linkage 234 includes a spring loaded plunger 238, lever 240 and shaft 242 coupled together in a general U-shaped configuration and rigid link element 254. Spring loaded plunger 238 has an arcuate cam follower shaped first end 244 that extends from spring loaded plunger element 238 toward actuator 210. Arcuate cam follower end 244 contacts an arcuate cam portion 239 of first end 230 of manual release handle 228. A second end 246 of spring loaded plunger 238 is rotatably coupled to a first end 248 of lever 240 and a second end 250 of lever 240 is rotatably coupled to a first end 252 of shaft 242. Shaft 242 extends through a shaft fitting 243 that extends outwardly from body 218 of actuator 210. A collar 247 is affixed around shaft 242 between shaft fitting 243 and first end 252 of shaft 242. A return spring 245 is disposed around shaft 242 between shaft fitting 243 and collar 247. Rigid link element 254, illustratively a rod or bar, fixedly couples a second end 256 of shaft 242 to the second end 236 of shaft 216 of actuator 210. Lever 240 of linkage 234 is rotatably coupled at about its mid-point to a fulcrum projection 258 of a flange 260 that extends outwardly from body 218 of lock pin actuator 210.

Spring loaded plunger 238 is spring loaded by a spring 262. Spring 262 has a first leg 264 having an end 266 that hooks around a first side 267 of spring loaded plunger 238 that faces toward actuator 210 and a second leg 268 having an end 270 that is received in a hole 272 in fulcrum projection 258.

Manual release mechanism 226 is utilized to retract lock pin 220 to allow thrust reverser sleeves 204 to be manually deployed to provide access to the thrust reverser area for servicing and maintenance of the thrust reverser. When manual release handle 228 is rotated to its open or release position, as shown in FIG. 19, arcuate cam portion 239 of its first end 230 forces spring loaded plunger 238 downwardly and outwardly (with respect to actuator 210). Spring loaded plunger 238 pushes first end 248 of lever 240 downwardly, causing second end 250 of lever 240 to push shaft 242 upwardly. The upward movement of shaft 242, acting through rigid link 254, pulls shaft 216 of actuator 210 upwardly, retracting lock pin 220. Collar 247 on shaft 242 is moved upwardly toward shaft fitting 243, compressing return spring 245. The thrust reverser actuation system translation actuators, such as translation actuators 54 (FIG. 3) can then be manually driven utilizing the existing manual drive of the thrust reverser actuation system to translate thrust reverser sleeves 204 to their deployed positions, carrying their respective manual release handles 228 along with them. When arcuate cam portion 239 of first end 230 of manual release handle 228 cams over center on cam follower end 244 of spring loaded plunger 238, manual release handle 228 is maintained in its open or release position against the force exerted by return springs 229 and 245.

When manual release handle 228 is moved towards its closed or unreleased position, return spring 229 will urge manual release handle 228 to its closed or position once arcuate cam portion 239 of first end 230 of manual release handle 228 cams over center on cam follower end 244 of spring loaded plunger 238. Return spring 245 urges shaft 242 downwardly, returning manual release mechanism to its normal or lock position.

Figure 20:
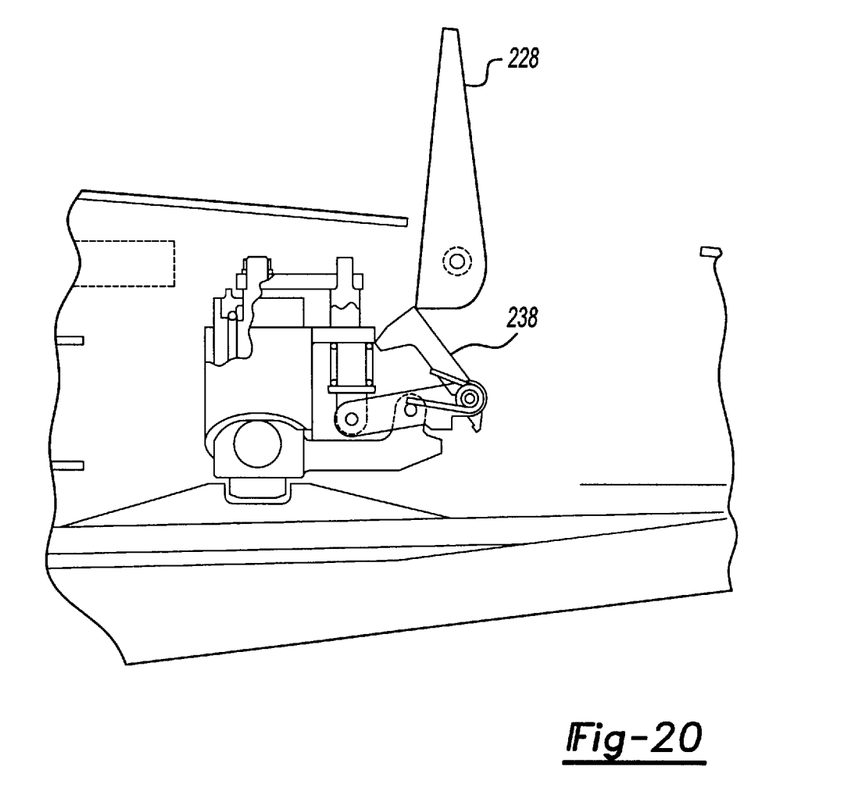
FIG. 20 is a side view of the out-of-plane thrust reverser sleeve lock of FIG. 19 with manual release mechanism having moved to a safe position.

Spring loaded plunger 238 prevents damage to manual release handle 228 upon the movement of thrust reverser sleeves 204 to their stowed positions in the event that manual release handle 228 is inadvertently left in its open or unlock positions. If manual release handle 228 is left open, when the associated thrust reverser sleeve 204 is within a few inches of its stowed position, manual release handle 228 contacts spring loaded plunger 238 causing spring loaded plunger 238 to pivot forward, as shown in FIG. 20, allowing manual release handle 228 to move forwardly against spring loaded plunger 238 to a safe position. Subsequent closing of manual release handle 228 to its closed position, as shown in FIG. 17, returns the components of manual release mechanism 226 to their normal positions. In this regard, spring 262 returns spring loaded plunger 238 to its normal position upon the closing of manual release handle 228.

Although thrust reverser sleeve lock 200 has been described in the context of use as an out-of-plane lock, it should be understood that thrust reverser sleeve lock 200 could also be used in lieu of thrust reverser sleeve lock 100. Conversely, thrust reverser sleeve lock 100 could be used as an out-of-plane lock in lieu of thrust reverser sleeve lock 200. However, thrust reverser sleeve lock 200 is thought to have a more simplified structure and actuation than thrust reverser sleeve lock 100 and is thus is thought to be a preferable embodiment of the invention. Further, it should be understood that while actuators 112, 210 have been described as hydraulic actuators, they could also be solenoid driven actuators.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a thrust reverser for a jet engine having a housing and a plurality of anti-deployment mechanisms, at least one of the anti-deployment mechanisms comprising a thrust reverser sleeve lock located out of the plane in which other of the anti-deployment mechanisms are located;
   wherein the thrust reverser sleeve lock includes a lock pin which interacts with the housing of the thrust reverser to prevent the movement of the thrust reverser sleeve lock.

2. The apparatus of claim 1, wherein the thrust reverser sleeve lock is located out of an uncontained rotor failure angular impact area.

3. The apparatus of claim 1, wherein the housing includes a thrust reverser sleeve such that when the lock pin is in a locked position, the lock pin engages a lock pin engagement element of a thrust reverser sleeve of the thrust reverser housing to prevent the thrust reverser sleeve from moving from a stowed position.

4. The apparatus of claim 1, wherein the lock pin is in a locked position when the lock pin engages a lock pin engagement element of a track slider, and
   wherein the track slider is coupled to a thrust reverser sleeve of the housing of the thrust reverser to prevent the thrust reverser sleeve from moving from a stowed position.

5. The apparatus of claim 4 wherein the lock pin engagement element comprises a lock pin hole in the track slider.

6. The apparatus of claim 1, wherein the thrust reverser includes a plurality of thrust reverser sleeves and at least one thrust reverser sleeve lock for each thrust reverser sleeve.

7. The apparatus of claim 6, wherein each thrust reverser sleeve includes a track slider having a lock pin engagement element that the lock pin of the thrust reverser sleeve lock for that thrust reverser sleeve engages when that thrust reverser sleeve lock is in a locked position.

8. The apparatus of claim 7, wherein each thrust reverser sleeve lock includes an actuator coupled to the lock pin of that thrust reverser sleeve lock for extending and retracting the lock pin between the locked and an unlocked position.

9. The apparatus of claim 8, wherein the lock pin is formed as part of a shaft of the actuator.

10. The apparatus of claim 9 wherein and further including a manually operated mechanical release mechanism coupled to the actuator.

11. The apparatus of claim 10 wherein the manually operated mechanical release mechanism includes a handle coupled by a linkage to an end of the shaft of the actuator.

12. The apparatus of claim 11 wherein the linkage includes a spring loaded plunger that moves forwardly upon being contacted by a first end of the handle when the handle is in a release position and the thrust reverser sleeve moves to a stowed position to prevent damage to the manual release mechanism.

13. The apparatus of claim 8 wherein the actuator comprises a single-action actuator having a hydraulic port.

14. The apparatus of claim 8, wherein the actuator comprises a solenoid driven actuator.

15. A thrust reverser sleeve lock for a thrust reverser sleeve of a thrust reverser, comprising an actuator having a lock pin that, when the actuator is in a lock position, engages a lock pin engagement element of the thrust reverser that moves with a thrust reverser sleeve between a stowed position and a deployed position, and when the actuator is in an unlock position, is disengaged from the lock pin engagement element, the thrust reverser sleeve lock mounted within an engine nacelle out of a plane in which other anti-deployment mechanisms of the thrust reverser are located.

16. A thrust reverser sleeve lock for a thrust reverser sleeve of a thrust reverser, comprising:
   (a) a main track slider of the thrust reverser having a lock pin engagement element;
   (b) a single-action actuator having a lock pin that engages the lock pin engagement element of the main track slider when the thrust reverser sleeve is in a stowed position and the actuator is in a lock position; and
   (c) the thrust reverser sleeve lock being located within an engine nacelle containing the thrust reverser out of a plane in which other anti-deployment mechanisms of the thrust reverser are located.

17. The thrust reverser sleeve lock of claim 16, wherein the thrust reverser sleeve lock is located out of an uncontained rotor failure angular impact area.

18. The thrust reverser sleeve lock of claim 17, wherein the actuator has a body having a shaft extending therethrough, the shaft having a first end having the lock pin, the actuator having a spring that urges the shaft of the actuator toward the lock pin hole in the main track slider to extend the lock pin to engage the lock pin element, the shaft of the actuator being retracted to retract the lock pin from engagement with the lock pin element of the main track slider upon pressurized hydraulic fluid being applied to the hydraulic port of the actuator.

19. The thrust reverser sleeve lock of claim 18, and further including a lever actuated manual mechanical release mechanism coupled to the actuator for manual actuation of the actuator.

20. The thrust reverser sleeve lock of claim 19, wherein the actuator comprises a hydraulic actuator.

21. The thrust reverser sleeve lock of claim 19, wherein the actuator comprises a solenoid driven actuator.

22. The thrust reverser sleeve lock of claim 19, wherein the lock pin engagement element comprises a lock pin hole in the main slider.

* * * * *